(12) United States Patent
VanderPloeg et al.

(10) Patent No.: US 10,705,332 B2
(45) Date of Patent: Jul. 7, 2020

(54) TRI-MODAL DISPLAY MIRROR ASSEMBLY

(71) Applicant: Gentex Corporation, Zeeland, MI (US)

(72) Inventors: John A. VanderPloeg, Zeeland, MI (US); Mark A. VanVuuren, Dorr, MI (US); Ethan J. Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 571 days.

(21) Appl. No.: 14/664,126

(22) Filed: Mar. 20, 2015

(65) Prior Publication Data

US 2015/0266427 A1    Sep. 24, 2015

Related U.S. Application Data

(60) Provisional application No. 61/968,715, filed on Mar. 21, 2014.

(51) Int. Cl.
*G02B 27/01* (2006.01)
*B60R 1/12* (2006.01)
(Continued)

(52) U.S. Cl.
CPC ............... *G02B 27/01* (2013.01); *B60R 1/04* (2013.01); *B60R 1/086* (2013.01); *B60R 1/12* (2013.01);
(Continued)

(58) Field of Classification Search
CPC .. B60R 1/12; B60R 1/04; B60R 1/086; B60R 2001/1253; G02B 27/01; G02B 27/0101; G02B 27/0149; G02B 2027/0159
(Continued)

(56) References Cited

U.S. PATENT DOCUMENTS 2,131,888 A    10/1938    Harris
2,632,040 A    3/1953    Rabinow
(Continued)

FOREIGN PATENT DOCUMENTS

EP    0513476    11/1992
EP    0899157    3/1993
(Continued)

OTHER PUBLICATIONS

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.
(Continued)

*Primary Examiner* — Darryl J Collins
*Assistant Examiner* — Journey F Sumlar
(74) *Attorney, Agent, or Firm* — Price Heneveld LLP; Bradley D. Johnson

(57) ABSTRACT

A display mirror assembly for a vehicle includes a housing configured for attachment to the vehicle; a prismatic element positioned in the housing; a partially reflective, partially transmissive coating provided on a rear surface of the prismatic element; a display mounted behind the prismatic element within the housing; and an actuator device for moving the prismatic element between three distinct viewing positions including a first viewing position, a second viewing position wherein the prismatic element is tilted higher than in the first viewing position, and a third viewing position wherein the prismatic element is tilted higher than in the second viewing position.

19 Claims, 4 Drawing Sheets

(51) Int. Cl.
*B60R 1/08* (2006.01)
*B60R 1/04* (2006.01)

(52) U.S. Cl.
CPC .. *B60R 2001/1253* (2013.01); *G02B 27/0149* (2013.01); *G02B 2027/0159* (2013.01)

(58) Field of Classification Search
USPC .................................................. 359/629–633
See application file for complete search history.

(56) References Cited

U.S. PATENT DOCUMENTS

| | | |
|---|---|---|
| 2,827,594 A | 3/1958 | Rabinow |
| 3,004,473 A | 10/1961 | Arthur et al. |
| 3,179,845 A | 4/1965 | Kulwiec |
| 3,581,276 A | 5/1971 | Newman |
| 3,663,819 A | 5/1972 | Hicks et al. |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | MacKs |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A | 2/1994 | Secor |
| 5,296,924 A | 3/1994 | Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |

(56) References Cited

U.S. PATENT DOCUMENTS

| | | |
|---|---|---|
| 5,883,739 A | 3/1999 | Ashihara et al. |
| 5,904,729 A | 5/1999 | Ruzicka |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,940,011 A | 8/1999 | Agravante et al. |
| 5,942,853 A | 8/1999 | Piscart |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 5,990,469 A | 11/1999 | Bechtel et al. |
| 6,008,486 A | 12/1999 | Stam et al. |
| 6,009,359 A | 12/1999 | El-Hakim et al. |
| 6,018,308 A | 1/2000 | Shirai |
| 6,025,872 A | 2/2000 | Ozaki et al. |
| 6,046,766 A | 4/2000 | Sakata |
| 6,049,171 A | 4/2000 | Stam et al. |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,255,639 B1 | 7/2001 | Stam et al. |
| 6,259,475 B1 | 7/2001 | Ramachandran et al. |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Avionique et al. |
| 6,329,925 B1 | 12/2001 | Skiver et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,363,326 B1 | 3/2002 | Scully |
| 6,369,701 B1 | 4/2002 | Yoshida et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,408,247 B1 | 6/2002 | Ichikawa et al. |
| 6,412,959 B1 | 7/2002 | Tseng |
| 6,415,230 B1 | 7/2002 | Maruko et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,442,465 B2 | 8/2002 | Breed et al. |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,466,701 B1 | 10/2002 | Ejiri et al. |
| 6,469,739 B1 | 10/2002 | Bechtel et al. |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | Deline et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,507,779 B2 | 1/2003 | Breed et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,575,643 B2 | 7/2003 | Takashashi |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |
| 6,611,610 B1 | 8/2003 | Stam et al. |
| 6,611,759 B2 | 8/2003 | Brosche |
| 6,614,387 B1 | 9/2003 | Deadman |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |

(56) References Cited

U.S. PATENT DOCUMENTS

| | | |
|---|---|---|
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,012,543 B2 | 3/2006 | Deline et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | Deline et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | Deline et al. |
| 7,321,112 B2 | 1/2008 | Stam et al. |
| 7,360,932 B2 | 4/2008 | Uken et al. |
| 7,417,221 B2 | 8/2008 | Creswick et al. |
| 7,446,650 B2 | 11/2008 | Scholfield et al. |
| 7,467,883 B2 | 12/2008 | Deline et al. |
| 7,468,651 B2 | 12/2008 | Deline et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,653,215 B2 | 1/2010 | Stam |
| 7,658,521 B2 | 2/2010 | Deline et al. |
| 7,683,326 B2 | 3/2010 | Stam et al. |
| 7,711,479 B2 | 5/2010 | Taylor et al. |
| 7,719,408 B2 | 5/2010 | Deward et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,237,909 B2 | 8/2012 | Ostreko et al. |
| 8,258,433 B2 | 9/2012 | Byers et al. |
| 8,282,226 B2 | 10/2012 | Blank et al. |
| 8,325,028 B2 | 12/2012 | Schofield et al. |
| 8,482,683 B2 | 7/2013 | Hwang et al. |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |

(56) References Cited

U.S. PATENT DOCUMENTS

| | | | |
|---|---|---|---|
| 2006/0132939 A1* | 6/2006 | Blank | B60R 1/12 359/838 |
| 2006/0139953 A1 | 6/2006 | Chou et al. | |
| 2006/0158899 A1 | 7/2006 | Ayabe et al. | |
| 2007/0171037 A1 | 7/2007 | Schofield et al. | |
| 2008/0068520 A1 | 3/2008 | Minikey, Jr. et al. | |
| 2008/0192132 A1 | 8/2008 | Bechtel et al. | |
| 2008/0247192 A1 | 10/2008 | Hoshi et al. | |
| 2008/0291000 A1* | 11/2008 | Kim | B60Q 9/008 340/436 |
| 2008/0294315 A1 | 11/2008 | Breed | |
| 2009/0015736 A1 | 1/2009 | Weller et al. | |
| 2009/0141516 A1 | 6/2009 | Wu et al. | |
| 2010/0201896 A1 | 8/2010 | Ostreko et al. | |
| 2013/0028473 A1 | 1/2013 | Hilldore et al. | |
| 2013/0279014 A1 | 10/2013 | Fish, Jr. et al. | |
| 2014/0347488 A1 | 11/2014 | Tazaki et al. | |

FOREIGN PATENT DOCUMENTS

| | | | |
|---|---|---|---|
| GB | 2338363 | 12/1999 | |
| JP | 1178693 | 3/1999 | |
| JP | 2005148119 | 6/2005 | |
| JP | 2005327600 | 11/2005 | |
| JP | 2008139819 A | 6/2008 | |
| WO | 9621581 | 7/1996 | |
| WO | 2007103573 A2 | 9/2007 | |
| WO | 2010090964 | 8/2010 | |
| WO | WO2012051500 A1 * | 4/2012 | B60R 1/12 |

OTHER PUBLICATIONS

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society for Information Display, Detroit Center, Santa Ana, CA.

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems," Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al., "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications," Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

* cited by examiner

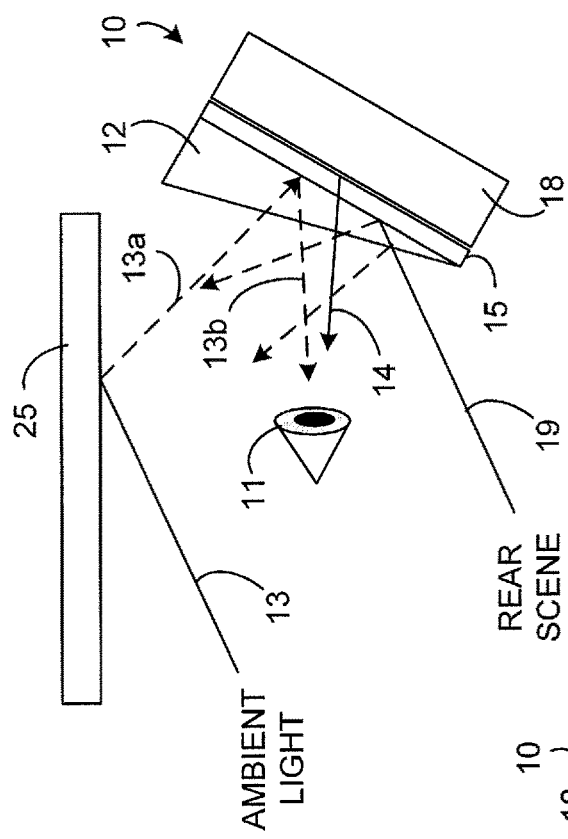
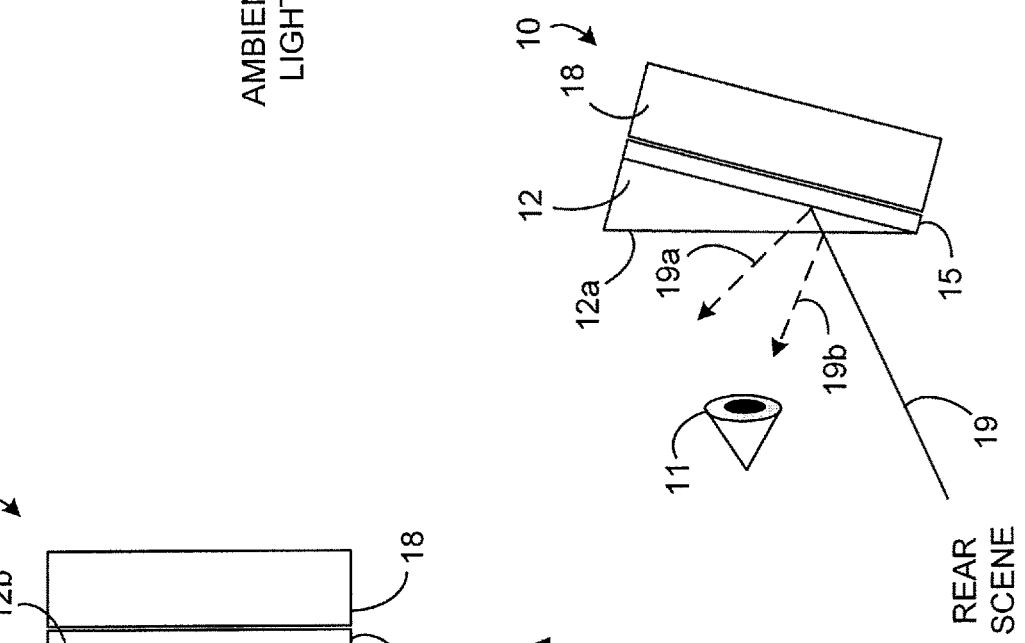
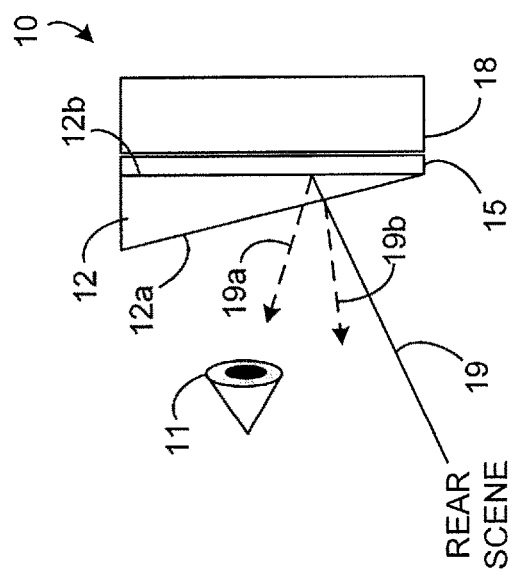

TRI-MODAL DISPLAY MIRROR ASSEMBLY

CROSS-REFERENCE TO RELATED APPLICATION

This application claims priority to and the benefit under 35 U.S.C. § 119(e) of U.S. Provisional Patent Application No. 61/968,715, filed on Mar. 21, 2014, entitled "TRI-MODAL DISPLAY MIRROR ASSEMBLY," the entire disclosure of which is hereby incorporated herein by reference.

FIELD OF THE INVENTION

The present invention generally relates to a rearview mirror assembly, and more particularly, a display mirror assembly.

SUMMARY OF THE INVENTION

According to one aspect of the present invention, a display mirror assembly for a vehicle includes a housing configured for attachment to the vehicle; a prismatic element positioned in the housing; a partially reflective, partially transmissive coating provided on a rear surface of the prismatic element; a display mounted behind the prismatic element within the housing; and an actuator device for moving the prismatic element between three distinct viewing positions including a first viewing position, a second viewing position wherein the prismatic element is tilted higher than in the first viewing position, and a third viewing position wherein the prismatic element is tilted higher than in the second viewing position.

According to one aspect of the present invention, a display mirror assembly for a vehicle includes a housing configured for attachment to a vehicle; a prismatic element positioned in the housing; a partially reflective, partially transmissive coating provided on a rear surface of the prismatic element; a display mounted behind the prismatic element within the housing; and an actuator device for moving the prismatic element between three distinct viewing positions including a first viewing position, a second viewing position and a third viewing position. A primary reflected image of a rearward scene is reflected from the partially reflective, partially transmissive coating and a secondary reflected image of the rearward scene is reflected from a front surface of the prismatic element at a different angle than the primary reflected image, the primary reflected image having a greater intensity than the secondary reflected image. When in the first viewing position, the prismatic element is positioned to reflect the primary reflected image towards a viewer's eyes. When in the second viewing position, the prismatic element is positioned to reflect the secondary reflected image towards the viewer's eyes. When in the third viewing position, the prismatic element is positioned such that a reflected image of a headliner of the vehicle is reflected towards the viewer's eyes and neither the primary nor secondary reflected images are reflected towards the viewer's eyes. The display is turned on when the prismatic element is in the third viewing position and is turned off when the prismatic element is in the first or second viewing positions.

According to one aspect of the present invention, a display mirror assembly for a vehicle includes a housing configured for attachment to a vehicle; a prismatic element positioned in the housing; a reflective coating provided on a rear surface of the prismatic element, the reflective coating having a transmissive region through which light may pass; a display mounted behind the prismatic element within the housing behind the transmissive region so as to project light therethrough; and an actuator device for moving the prismatic element between three distinct viewing positions including a first viewing position, a second viewing position wherein the prismatic element is tilted higher than in the first viewing position, and a third viewing position, wherein the prismatic element is tilted higher than in the second viewing position, wherein the display is turned on when the prismatic element is in the third viewing position and is turned off when the prismatic element is in the first or second viewing positions.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 4A is a schematic illustration of the optical components of the display mirror assembly of FIGS. 1-3 shown in a first viewing position;

FIG. 4B is a schematic illustration of the optical components of the display mirror assembly of FIGS. 1-3 shown in a second viewing position; and FIG. 4C is a schematic illustration of the optical components of the display mirror assembly of FIGS. 1-3 shown in a third viewing position.

DETAILED DESCRIPTION

Figure 1:
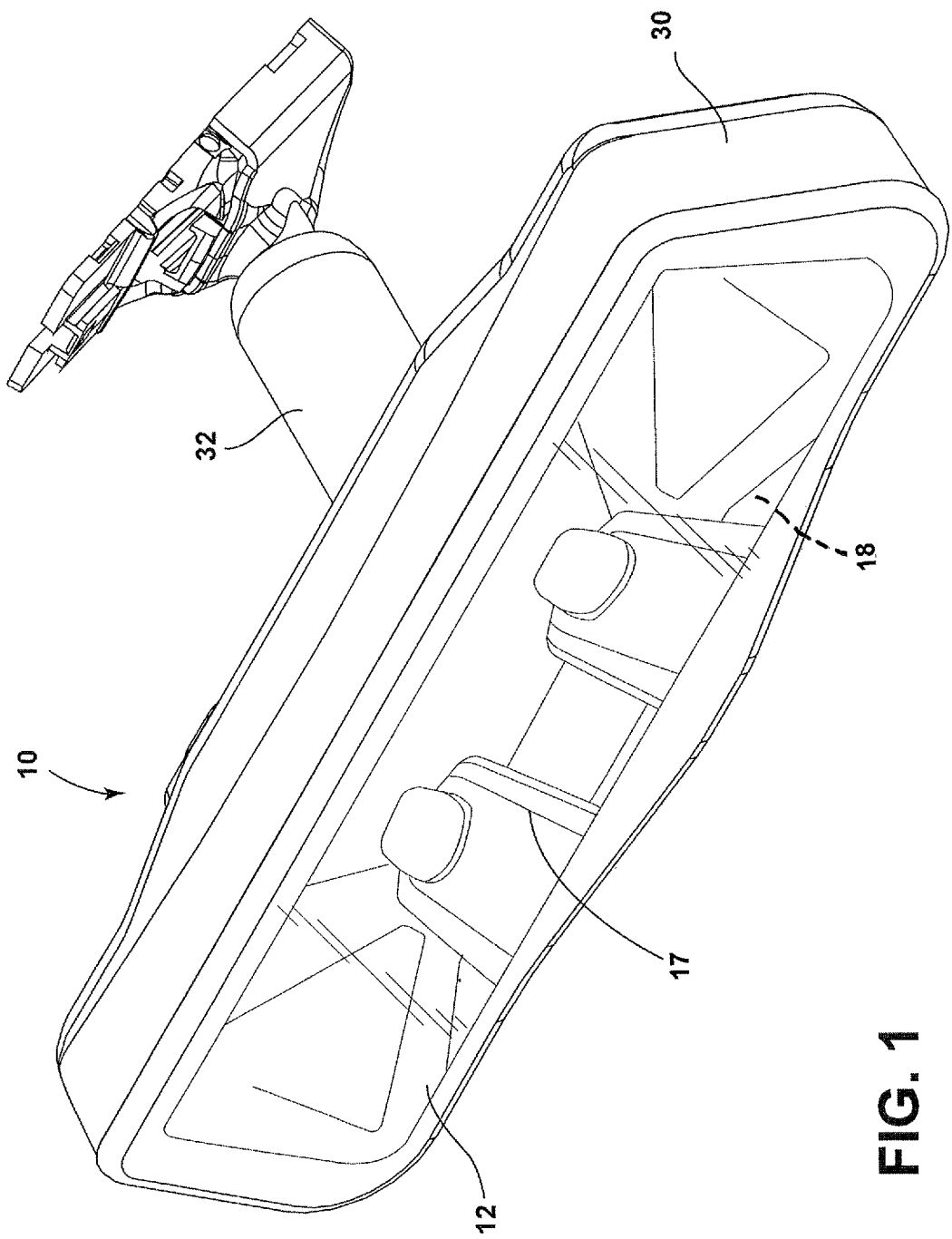
FIG. 1 is a top front perspective view of a display mirror assembly for a vehicle, in accordance with one embodiment of the present invention.

The present illustrated embodiments reside primarily in combinations of method steps and apparatus components related to a rearview mirror assembly. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 2:
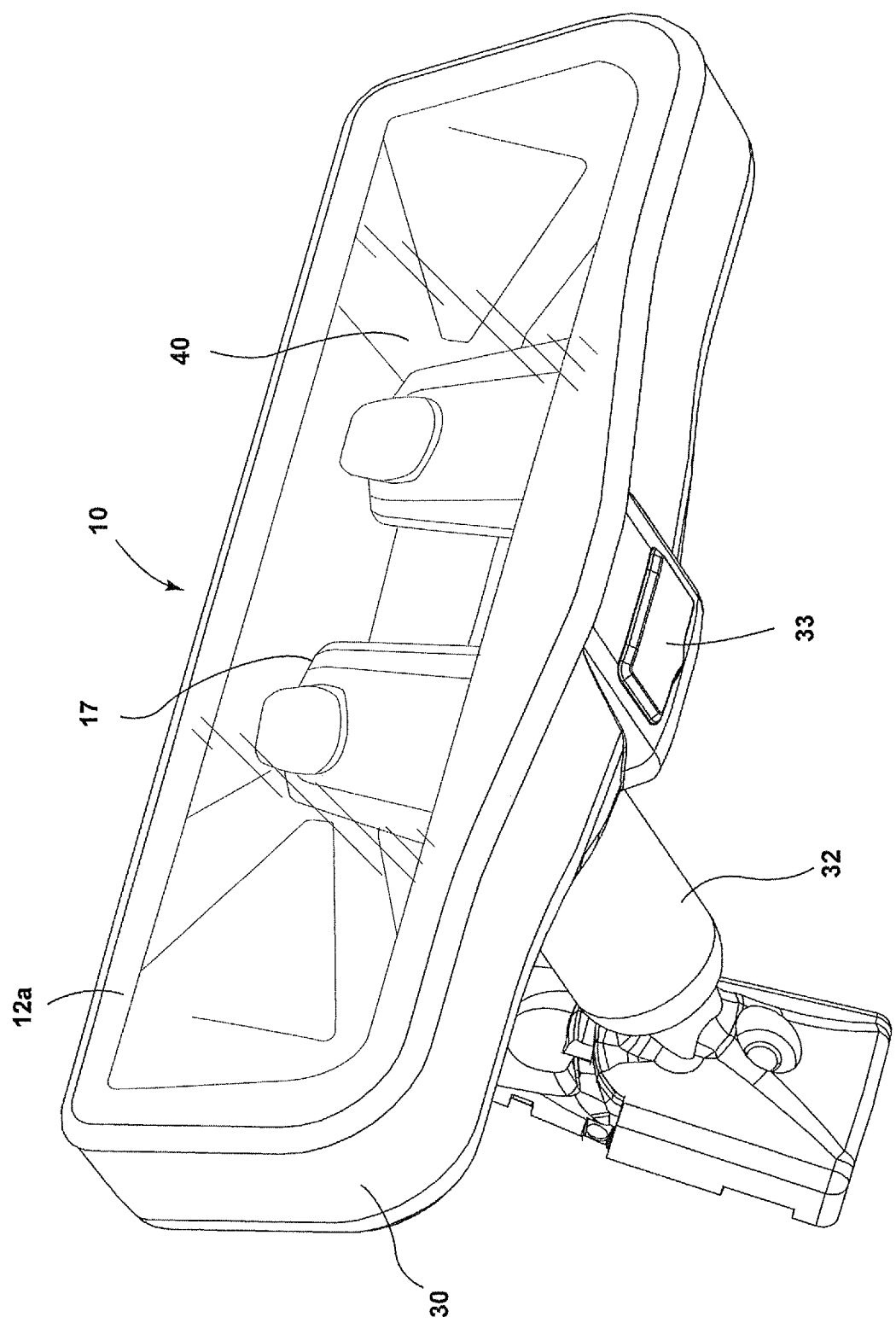
FIG. 2 is a bottom front perspective view of the display mirror assembly of FIG. 1.
Figure 3:
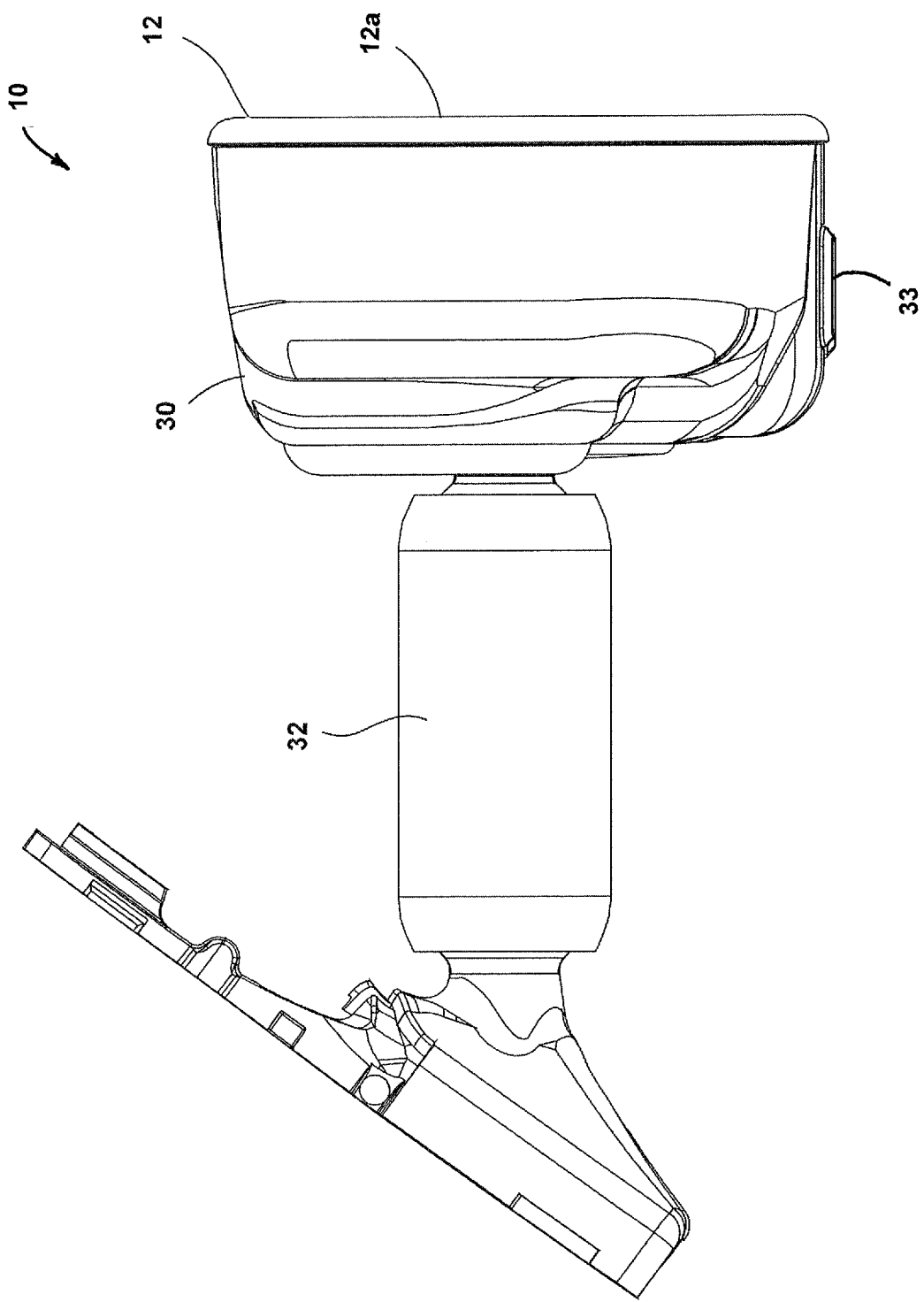
FIG. 3 is a side elevation view of the display mirror assembly of FIG. 1.

Referring now to the drawings, reference numeral 10 generally designates a display mirror assembly for a vehicle. As shown in FIGS. 4A-4C, the display mirror assembly 10 includes a prismatic wedge element 12 having a partially reflective, partially transmissive coating or layer 15 provided on a rear surface 12b of prismatic wedge element 12 (the prismatic wedge element 12 and coating 15 are collectively referred to herein as a "prismatic element") and a display 18 that is viewed through the prismatic element 12. As shown in FIGS. 1-3, a housing 30 at least partially receives the prismatic element 12 (and the display 18), and includes a mounting member 32 extending rearwardly therefrom. The mounting member 32 is adapted for mounting on a windshield or header of a vehicle. The mounting member 32 may be operably engaged with the housing 30 in any known manner. Examples of a display mirror are described in U.S. Pat. No. 8,879,139 and U.S. Patent Application Publication No. US 2014/0268351 A1, both of which are hereby incorporated herein by reference in their entirety.

Referring generally to FIGS. 1-3, the display mirror assembly 10 has a viewing area 40, which includes a front surface 12a of the prismatic element 12. The viewing area 40 may be a rectangular shape, a trapezoidal shape, or any custom contoured shape desired for aesthetic reasons. The perimeter of the prismatic element 12 may also have a ground edge, a beveled edge, or be frameless.

The display 18 may be generally planar, with outer edges defining a front surface. The front surface of the display 18 can be shaped to correspond to and fit within the shape of the viewing area 40 of the display mirror assembly 10. As exemplary illustrated in FIG. 1, the display 18 can have a trapezoidal shape. However, it should be appreciated by those skilled in the art that the display 18 can have other shapes, such as, but not limited to, square, rectangular, symmetrical, non-symmetrical, or contoured. The display 18 may have a front surface which fits within, but is not complementary to the viewing area 40, for example, where the front surface of the display 18 is generally rectangular and the front surface 12a of the prismatic element 12 has a contoured outer perimeter. The distance between the outer edges of the display 18 and the outer perimeter of the prismatic element 12 may be about 9 mm or less along at least a portion of the outer edges of display 18. The display 18 may be a liquid crystal display (LCD), LED, OLED, plasma, DLP or other display technology. Various types of LCDs can be used, including, but not limited to, twisted nematic (TN), in-plane switching (IPS), fringe field switching (FFS), vertically aligned (VA), etc.

By way of explanation and not limitation, in operation, the display mirror assembly 10 can be used as a full display mirror in a vehicle to be operational substantially continuously while driving, as opposed to back-up display systems that are used only during certain times of vehicle operation (i.e., when the vehicle is in reverse gear).

With respect to the following description, the prismatic element 12 is considered to be in a first viewing position when a primary reflected image 19a of light 19 from a desired rear scene is reflected off the partially reflective, partially transmissive coating 15 toward the eyes 11 of a viewer (see FIG. 4A). This provides the driver with the brightest reflected image of the rear scene and is generally intended to be used during daylight. Further, a secondary reflected image 19b of light 19 from the rear scene is reflected off the front surface 12a of prismatic element 12. However, the primary reflected image 19a has a much higher intensity than the secondary reflected image 19b and the secondary reflected image 19b is reflected downward away from the viewer's eyes 11, and therefore, the viewer does not notice any double images in the viewed image. When the prismatic element 12 is in the first viewing position and is being used during nighttime driving conditions, headlights from a trailing vehicle (i.e., a vehicle driving behind the vehicle with the display mirror assembly 10) can cause a glare which is visible and potentially distracting to the driver.

According to one embodiment of the present invention, an actuator device 33, as shown in FIGS. 2 and 3, is operably coupled to the display mirror assembly 10. When actuated, the actuator device 33 moves at least the prismatic element 12 from the first viewing position. The actuator device 33 may also move the whole housing 30. Actuation of the actuator device 33 tilts or rotates the prismatic element 12 upwards to move the prismatic element 12 to one of two viewing positions (the second viewing position [FIG. 4B] and the third viewing position [FIG. 4C]). The actuator device 33 can also be configured to move the display 18 upon activation. When in the second viewing position, the prismatic element 12 is positioned to reflect the secondary reflected image 19b towards the viewer's eyes 11 while the primary reflected image 19a is reflected upward away from the viewer's eyes. This allows the driver to only see the lower intensity secondary reflected image 19b during nighttime driving so that headlights from a trailing vehicle are less likely to produce a distracting glare. In other words, the driver instead sees reflections from the front surface of prismatic element 12, which are much lower in intensity.

Due to the display 18 being viewed through the prismatic element 12, any glare on the prismatic element 12 may interfere with the visibility of the display 18 when the display is turned on. Likewise, the displayed images from the display 18 may interfere with the viewing of the reflected image (19a or 19b). Thus, the actuator device 33 can also be configured to turn the display 18 on or off depending on the selected viewing position. Therefore, when the actuator device 33 is actuated to move the prismatic element 12 to the first viewing position or the second viewing position, the display 18 can be turned off so as to not interfere with the reflected image (19a or 19b). When the actuator device 33 is actuated to move the prismatic element 12 to the third viewing position, the display 18 can be turned on. More specifically, the first viewing position (FIG. 4A) is used when the display 18 is off and daytime conditions exist. The second viewing position (FIG. 4B) tilts the prismatic element 12 slightly upward and is used during nighttime conditions while the display is off.

The light reflected from either the reflective coating 15 or the front surface 12a of prismatic element 12 (when in the first and second viewing positions) may nevertheless produce unwanted reductions in contrast when the display 18 is turned on. Accordingly, the third viewing position is provided in which the prismatic element 12 is tilted even further upward so that reflected images (19a and 19b) from both the reflective coating 15 and the front surface 12a of prismatic element 12 are directed upward away from the driver's eyes 11. When prismatic element 12 is in the third viewing position, during daytime conditions, ambient light 13 that reflects off a headliner 25 of the vehicle (light 13a) is reflected from prismatic element 12 (light 13b) towards the driver's eyes 11 so that the driver would only see a reflected image of the vehicle's headliner 25 rather than the rear scene through the rear window. Such a reflection from the headliner 25 is much less distracting when superimposed on the displayed image from display 18 than reflections of the rear scene through the rear window.

Although the display 18 is shown as having a front surface that is parallel to the rear surface 12b of the prismatic element 12, the display 18 may be disposed at an angle so that the front surface of display 18 is perpendicular to the path extending to the driver's eyes when the prismatic element 12 is in the third position.

Additionally, to provide information to the viewer of the display mirror assembly 10, the display mirror assembly 10 may include information regarding the field of view 17, such as a partially transmissive graphic overlay or an image on the display 18 visible on the viewing area 40 when the display 18 is in use.

It is contemplated that actuator device 33 may take the form of a conventional actuator device used in prismatic mirrors with the exception that it would be modified to provide for tilting the prismatic element to a third viewing position. Examples of such actuator devices are described in commonly assigned U.S. Pat. No. 4,443,057 and U.S. Provisional Application Nos. 62/121,935; 62/121,915; 62/121,960; and 62/121,983, the entire disclosures of which are incorporated herein by reference. The actuator device in these applications could be modified such that the rotating cam has an additional third flat surface on which to rest when in the third viewing position.

It is also possible to use an automated actuator device such as that disclosed in commonly-assigned U.S. Pat. No. 4,443,057 modified to include a third viewing position that is selected whenever the display is turned on. In this case, the automatic actuator device could move the prismatic element 12 between the first and second viewing positions based upon sensed light levels forward and optionally rearward of the display mirror assembly. The entire disclosure of U.S. Pat. No. 4,443,057 is incorporated herein by reference.

Coating 15 may be configured as any of the partially reflective, partially transmissive coatings disclosed in U.S. Pat. No. 6,700,692, the entire disclosure of which is incorporated herein by reference. Coating 15 may cover the entire rear surface 12b of prismatic element 12 or coating 15 may be highly reflective and substantially non-transmissive in some areas of prismatic element while being partially reflective, partially transmissive only in the area in front of display 18 (if display 18 is smaller than viewing area 40).

It will be appreciated that embodiments of the invention described herein may be comprised of one or more conventional processors and unique stored program instructions that control one or more processors to implement, in conjunction with certain non-processor circuits, some, most, or all of the functions of a display mirror assembly 10, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A display mirror assembly for a vehicle, comprising:
a housing configured for attachment to a vehicle;
a prismatic element positioned in said housing;
a partially reflective, partially transmissive coating provided on a rear surface of said prismatic element;
a display mounted behind said prismatic element within said housing; and
an actuator device for moving said prismatic element between three distinct viewing positions including a first viewing position, a second viewing position wherein said prismatic element is tilted higher than in the first viewing position, and a third viewing position wherein said prismatic element is tilted higher than in the second viewing position, wherein said display is automatically turned on in response to said prismatic element moving into the third viewing position and is automatically turned off in response to said prismatic element moving into the first or second viewing positions.

2. The display mirror assembly of claim 1, wherein, when in the third viewing position, said prismatic element is tilted upward such that a reflected image of a headliner of the vehicle is reflected towards a viewer's eyes.

3. The display mirror assembly of claim 1, wherein said actuator device also moves said display with said prismatic element.

4. The display mirror assembly of claim 1, wherein said actuator device also moves said housing with said prismatic element.

5. The display mirror assembly of claim 1, wherein a primary reflected image of a rearward scene is reflected from said partially reflective, partially transmissive coating and a secondary reflected image of the rearward scene is reflected from a front surface of said prismatic element at a different angle than the primary reflected image, the primary reflected image having a greater intensity than the secondary reflected image, wherein:
when in the first viewing position, said prismatic element is positioned to reflect the primary reflected image towards a viewer's eyes,
when in the second viewing position, said prismatic element is positioned to reflect the secondary reflected image towards the viewer's eyes,
when in the third viewing position, said prismatic element is positioned such that a reflected image of a headliner of the vehicle is reflected towards the viewer's eyes and neither the primary nor secondary reflected images are reflected towards the viewer's eyes, and
said display is turned on when said prismatic element is in the third viewing position and is turned off when said prismatic element is in the first or second viewing positions.

6. The display mirror assembly of claim 1, wherein said housing has an aperture defining a viewing area and wherein said display is configured to display an image having substantially the same size and shape as the viewing area.

7. A display mirror assembly for a vehicle, comprising:
a housing configured for attachment to a vehicle;
a prismatic element positioned in said housing;
a partially reflective, partially transmissive coating provided on a rear surface of said prismatic element;
a display mounted behind said prismatic element within said housing; and
an actuator device for moving said prismatic element between three distinct viewing positions including a first viewing position, a second viewing position and a third viewing position,
wherein a primary reflected image of a rearward scene is reflected from said partially reflective, partially transmissive coating and a secondary reflected image of the rearward scene is reflected from a front surface of said prismatic element at a different angle than the primary reflected image, the primary reflected image having a greater intensity than the secondary reflected image, wherein:
when in the first viewing position, said prismatic element is positioned to reflect the primary reflected image towards a viewer's eyes,
when in the second viewing position, said prismatic element is positioned to reflect the secondary reflected image towards the viewer's eyes,
when in the third viewing position, said prismatic element is positioned such that a reflected image of a headliner of the vehicle is reflected towards the viewer's eyes and neither the primary nor secondary reflected images are reflected towards the viewer's eyes, and
said display is turned on when said prismatic element is in the third viewing position and is turned off when said prismatic element is in the first or second viewing positions.

8. The display mirror assembly of claim 7, wherein, when in the second viewing position, said prismatic element is tilted higher than in the first viewing position, and when in the third viewing position, said prismatic element is tilted higher than in the second viewing position.

9. The display mirror assembly of claim 7, wherein said actuator device also moves said display with said prismatic element.

10. The display mirror assembly of claim 7, wherein said actuator device also moves said housing with said prismatic element.

11. The display mirror assembly of claim 7, wherein said housing has an aperture defining a viewing area and wherein said display is configured to display an image having substantially the same size and shape as the viewing area.

12. The display mirror assembly of claim 7, wherein said partially reflective, partially transmissive coating is provided over the entire rear surface of said prismatic element.

13. A display mirror assembly for a vehicle, comprising:
a housing configured for attachment to a vehicle;
a prismatic element positioned in said housing;
a reflective coating provided on a rear surface of said prismatic element, said reflective coating having a transmissive region through which light may pass;
a display mounted behind said prismatic element within said housing behind said transmissive region so as to project light therethrough; and
an actuator device for moving said prismatic element between three distinct viewing positions including a first viewing position, a second viewing position wherein said prismatic element is tilted higher than in the first viewing position, and a third viewing position wherein said prismatic element is tilted higher than in the second viewing position,
wherein said display is turned on when said prismatic element is in the third viewing position and is turned off when said prismatic element is in the first or second viewing positions.

14. The display mirror assembly of claim 13, wherein, when in the third viewing position, said prismatic element is tilted upward such that a reflected image of a headliner of the vehicle is reflected towards a viewer's eyes.

15. The display mirror assembly of claim 13, wherein said actuator device also moves said display with said prismatic element.

16. The display mirror assembly of claim 13, wherein said actuator device also moves said housing with said prismatic element.

17. The display mirror assembly of claim 13, wherein a primary reflected image of a rearward scene is reflected from said reflective coating and a secondary reflected image of the rearward scene is reflected from a front surface of said prismatic element at a different angle than the primary reflected image, the primary reflected image having a greater intensity than the secondary reflected image,
   wherein:
      when in the first viewing position, said prismatic element is positioned to reflect the primary reflected image towards a viewer's eyes,
      when in the second viewing position, said prismatic element is positioned to reflect the secondary reflected image towards the viewer's eyes,
      when in the third viewing position, said prismatic element is positioned such that a reflected image of a headliner of the vehicle is reflected towards the viewer's eyes and neither the primary nor secondary reflected images are reflected towards the viewer's eyes, and
      said display is turned on when said prismatic element is in the third viewing position and is turned off when said prismatic element is in the first or second viewing positions.

18. The display mirror assembly of claim 13, wherein said housing has an aperture defining a viewing area and wherein said display is configured to display an image having substantially the same size and shape as the viewing area.

19. The display mirror assembly of claim 13, wherein said reflective coating is a partially reflective, partially transmissive coating provided over the entire rear surface of said prismatic element.

* * * * *